July 15, 1952 P. W. NOSKER 2,603,433

AERIAL TORPEDO

Filed July 13, 1943 8 Sheets-Sheet 2

INVENTOR
PAUL W. NOSKER
BY Edgar H. Snodgrass and Wade Koontz
ATTORNEYS

July 15, 1952 P. W. NOSKER 2,603,433

AERIAL TORPEDO

Filed July 13, 1943 8 Sheets-Sheet 1

INVENTOR
PAUL W. NOSKER
BY Edgar H. Snodgrass and
Wade Koontz
ATTORNEYS

INVENTOR
PAUL W. NOSKER
BY Edgar H. Snodgrass
Clyde Koontz
ATTORNEYS

July 15, 1952 P. W. NOSKER 2,603,433

AERIAL TORPEDO

Filed July 13, 1943 8 Sheets-Sheet 4

INVENTOR
PAUL W. NOSKER
By Edgar H. Snodgrass and
Elwade Koouly
ATTORNEYS

July 15, 1952 P. W. NOSKER 2,603,433

AERIAL TORPEDO

Filed July 13, 1943 8 Sheets-Sheet 5

INVENTOR
PAUL W. NOSKER
BY Edgar H. Snodgrass
Wade Koontz
ATTORNEYS

July 15, 1952 P. W. NOSKER 2,603,433

AERIAL TORPEDO

Filed July 13, 1943 8 Sheets-Sheet 6

INVENTOR
PAUL W. NOSKER
By Edgar B. Snodgrass and
Clade Koontz
ATTORNEYS

INVENTOR
PAUL W. NOSKER
By Edgar H. Snodgrass and Clade Koontz
ATTORNEYS

July 15, 1952 P. W. NOSKER 2,603,433

AERIAL TORPEDO

Filed July 13, 1943 8 Sheets-Sheet 8

INVENTOR
PAUL W. NOSKER
BY Edgar H. Snodgrass and Clade Koont
ATTORNEYS

Patented July 15, 1952 2,603,433

UNITED STATES PATENT OFFICE 2,603,433

AERIAL TORPEDO

Paul W. Nosker, Yellow Springs, Ohio

Application July 13, 1943, Serial No. 494,462

27 Claims. (Cl. 244—14)

(Granted under the act of March 3, 1883, as amended April 30, 1928; 370 O. G. 757)

The invention described herein may be manufactured and used by or for Government for governmental purposes, without the payment to me of any royalty thereon.

This invention relates to aerial torpedoes, and among other objects, aims to provide a self-propelled torpedo which is inherently faster than any conventional airplane, so that when properly guided it may overtake and destroy hostile aircraft by detonation of an explosive charge. The torpedo of my invention will be an extraordinarily difficult target because of its extremely high speed and small size. Another object is to provide an aerial torpedo light enough to be carried (partly disassembled if desired) within an airplane of the bombardment or cargo type and adapted to be launched while the airplane is in flight. Another object is to provide an aerial torpedo which has automatic flight-directing devices that may, however, be controlled by an operator of a radio wave transmitting system. Another object is to provide a flying torpedo which will seek out and fly directly to any source of infrared rays (e. g., the power plant of an enemy plane), without guidance from radio waves or any source other than that of said rays. Another object is to provide an aerial torpedo having automatic, radio-controlled, and infrared ray-controlled flight-directing devices, wherein radio waves at the will of an operator may switch the controls from automatic to radio-controlled flight or alternatively to infrared ray-controlled flight. A further object is to provide a control system for aerial torpedoes of the type indicated above which permits master control by radio impulses, regardless of the character of control which is directing the flight at the instant master control takes over. A further object is to provide a reliable and sensitive radio control system for the torpedoes. Another object is the provision of a radio control system which an enemy will find extraordinarily difficult to direct or take over. A still further object is to cause detonation by radio wave control, or automatically when close to or in collision with the target, or automatically after slowing down or stopping of the power plant. Additionally, the invention aims to provide practicable means for launching the torpedo from a "mother ship," which may be a cargo type airplane or even a dirigible. Other objects will appear in the specification.

The broad idea of an aerial torpedo is of course old, being suggested in such patents as the Murdock Patent No. 1,303,105 and the Mathews Patent No. 1,411,861. L. B. Sperry in Patent No. 1,418,605 described the use of a pilotless airplane controlled by a gyroscopic steering device, with an arrangement for automatic detonation after a certain length of time has elapsed from the launching. In Patent No. 1,792,937 E. A. Sperry disclosed an aerial torpedo wherein the direction of flight may be controlled from a radio wave transmitting station throughout the entire flight (if within the limits of control of the station). Hammond in Patent No. 1,818,708 disclosed a pilotless glider adapted to be released from the fuselage of an airplane and guided during its descent by radio control, with provisions for detonation upon contact, or after a certain time interval, or after sinking to a certain depth in water. The prior art contains other suggestions for utilizing generally analogous systems on boats, motor vehicles, bombs and the like which are in this application referred to in the claims under the generic term "movable objects" and to which this control system may be applied.

Various systems have been proposed for locating airplanes in flight. In some of these use is made of radiant energy generated at and radiated from a position occupied by an observer with the defending forces. The conventional forms of radio detection fall into this category, as do also all methods of aircraft identification that are based upon the reception of radiant energy reflected by the airplanes on other objects under observation. However, all such schemes are subject to the inherent disadvantage that they are capable of being hampered by the hostile forces, either by intentional transmission of interfering radiation or by the use of non-conducting structures (such as wood or plastic types) that are relatively poor reflectors of electro-magnetic waves.

In contrast with the foregoing, I provide apparatus which will receive and interpret infrared radiation emanating from airplanes, and will act on circuits controlling servo-motors in turn controlling the guiding devices on the aerial torpedo. The outstanding advantage of this method is that no action on the part of the hostile airplane or its crew can eliminate the infrared radiation that is inevitably associated with the operation and cooling of all airplane power plants. Any attempt at the production of interfering infrared radiation on an airplane by its crew would serve merely to increase the total radiation and hence would assist, rather than hinder, defending forces supplied with the aerial torpedoes. Other advantages and uses of my invention are discussed following the detailed description of the preferred embodiment thereof shown in the accompanying drawings.

In said drawings.

Figure 4A:
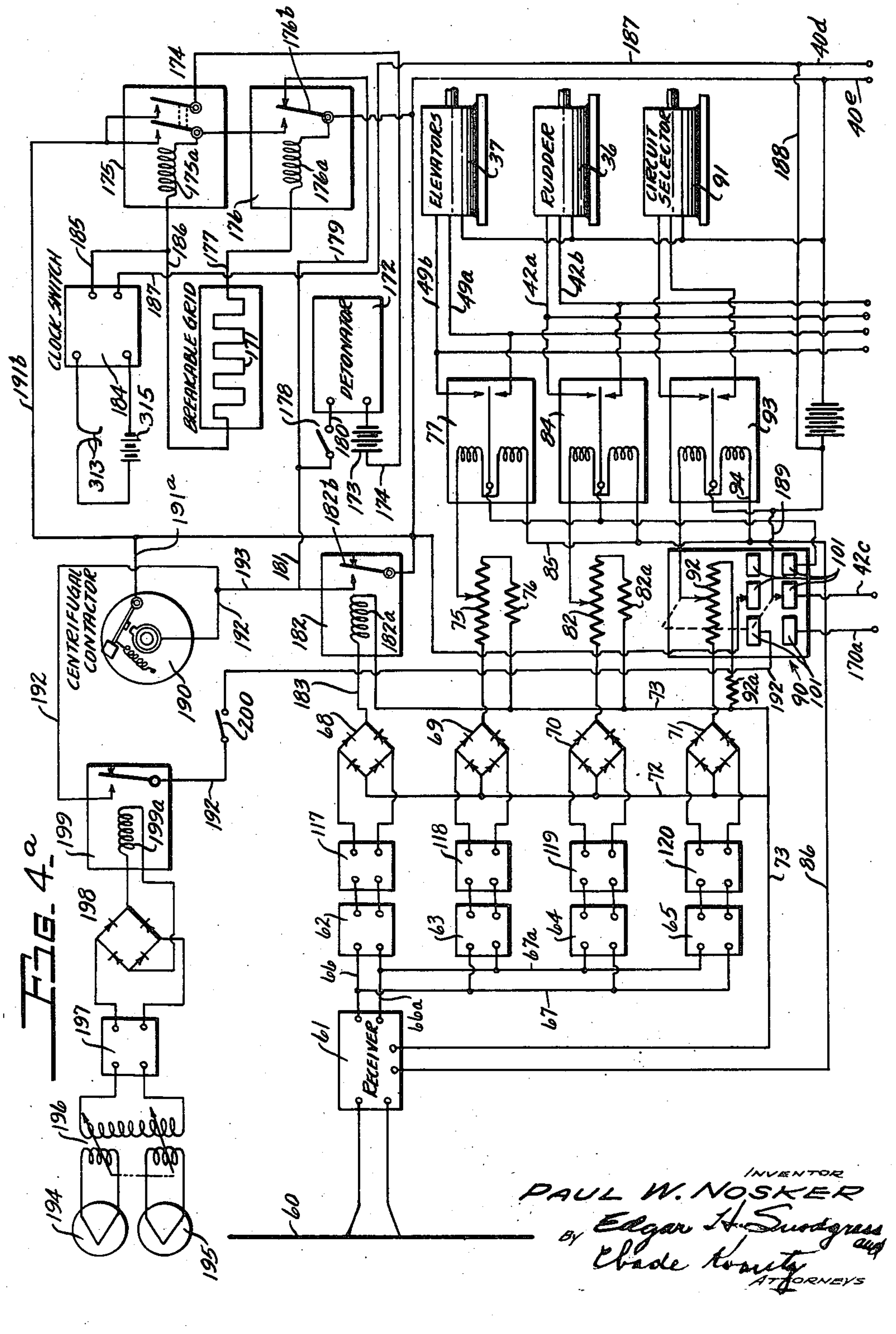
Figure 4B:
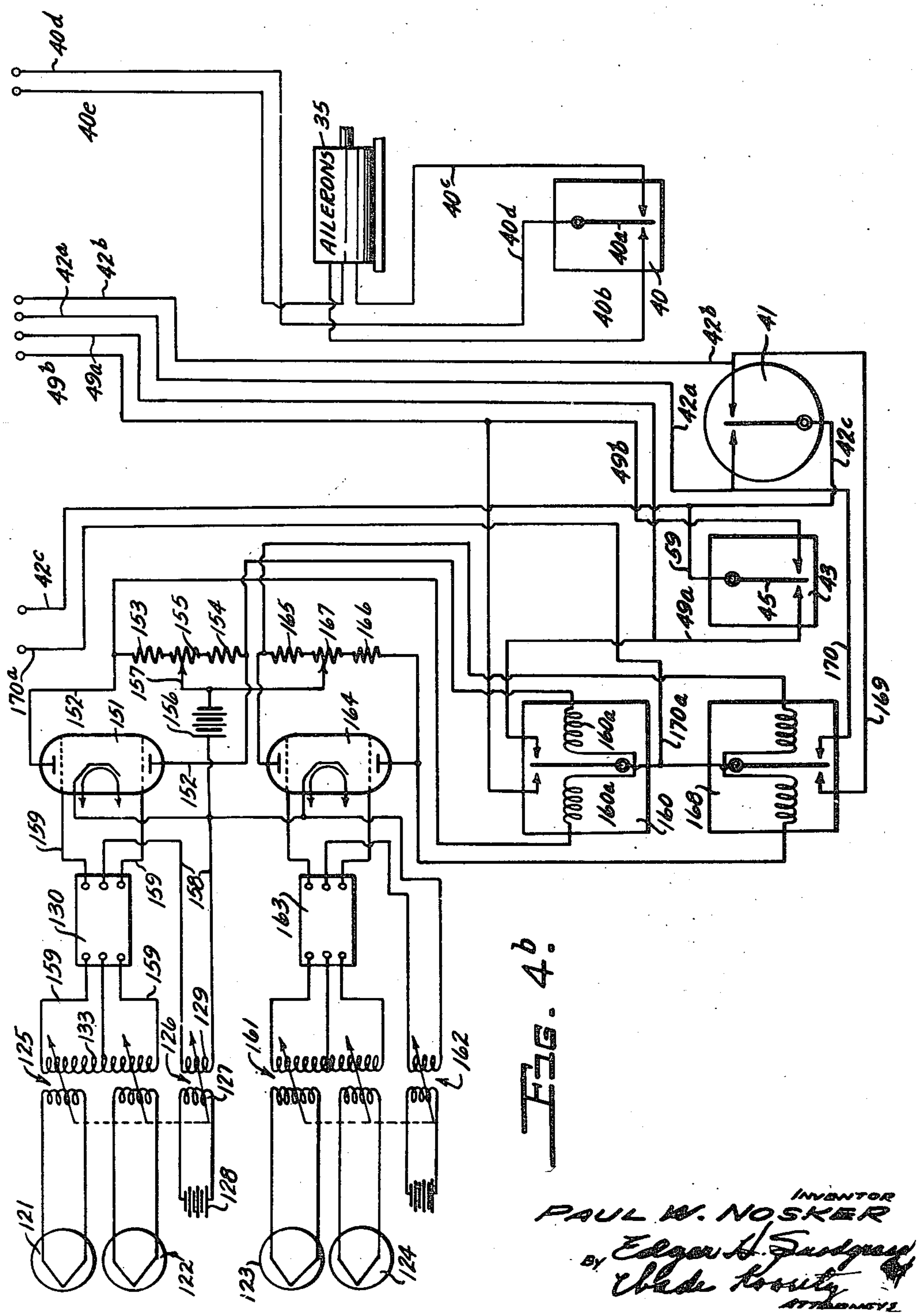
Figure 5:
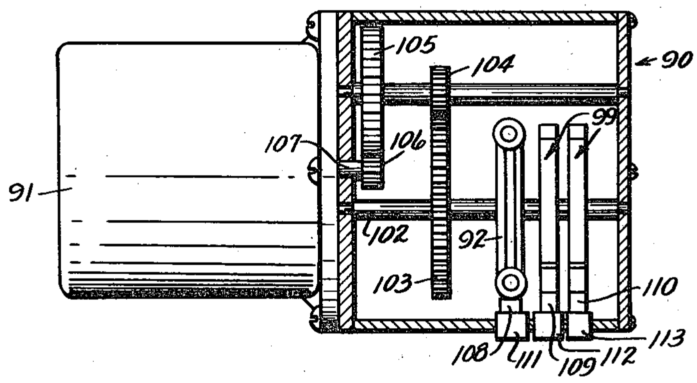
Figure 7:
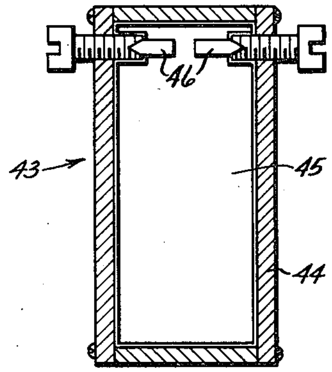
Figure 8:
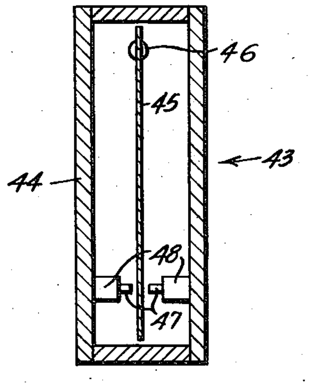
Figure 6:
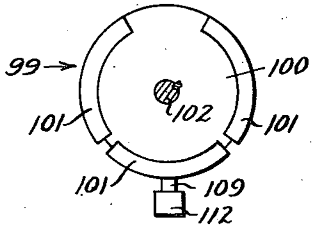
Figure 9:
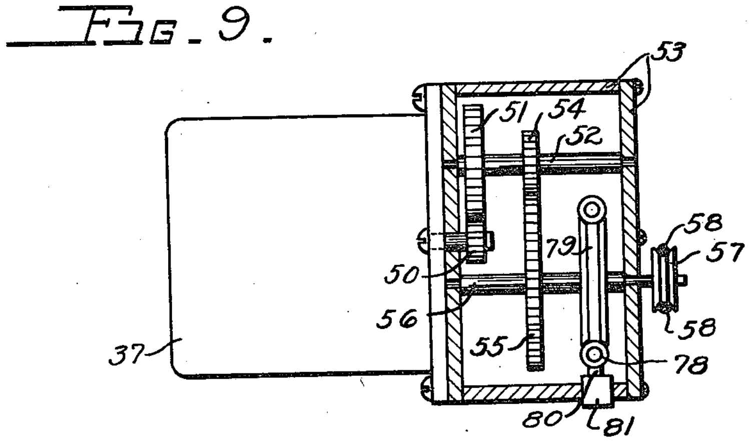
Figure 12:
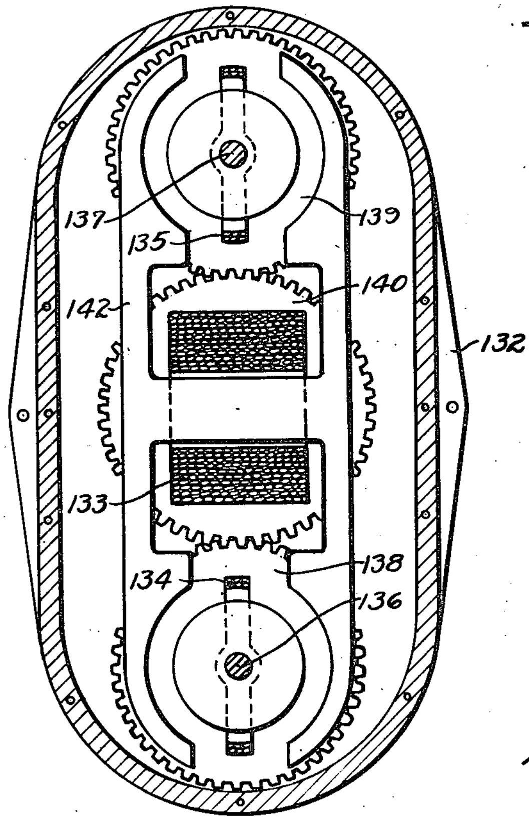
Figure 10:
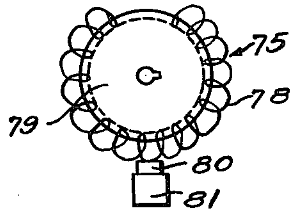
Figure 11:
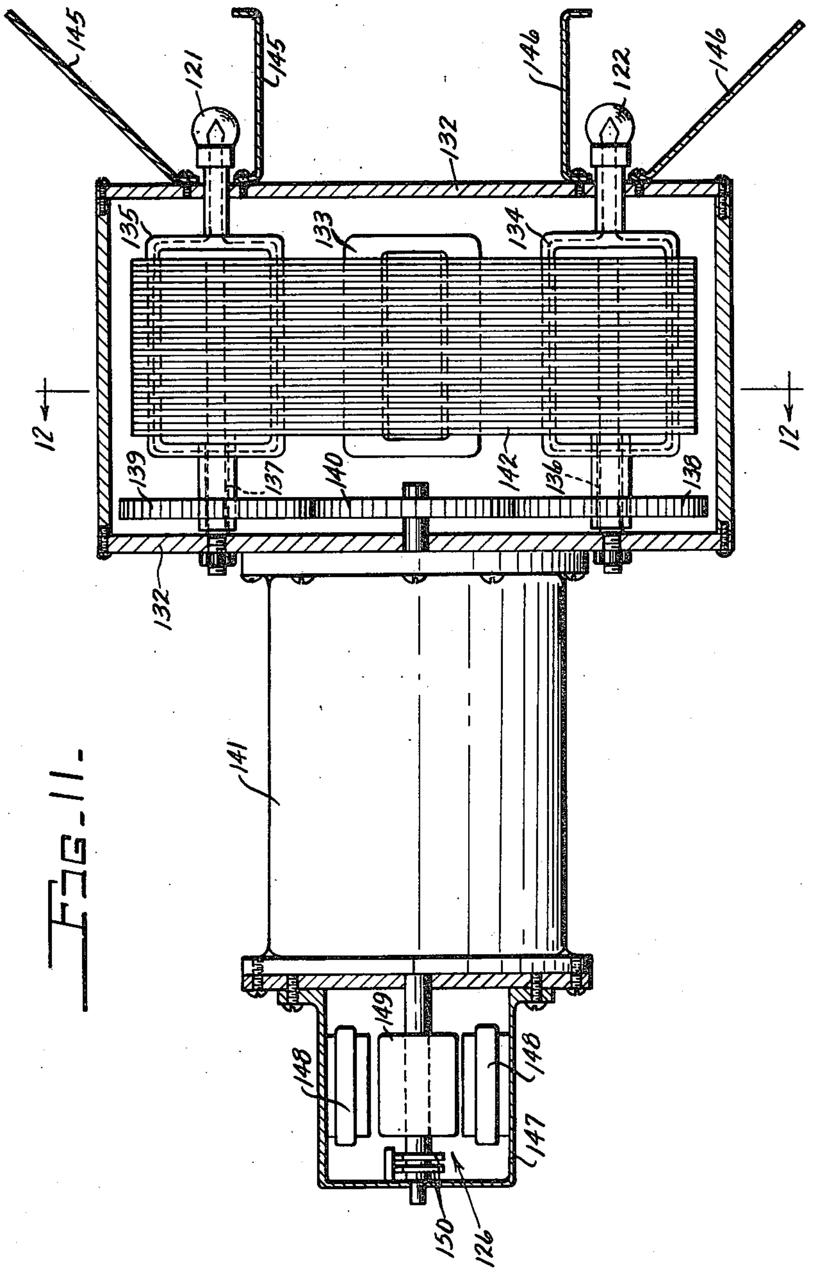
Figure 14:
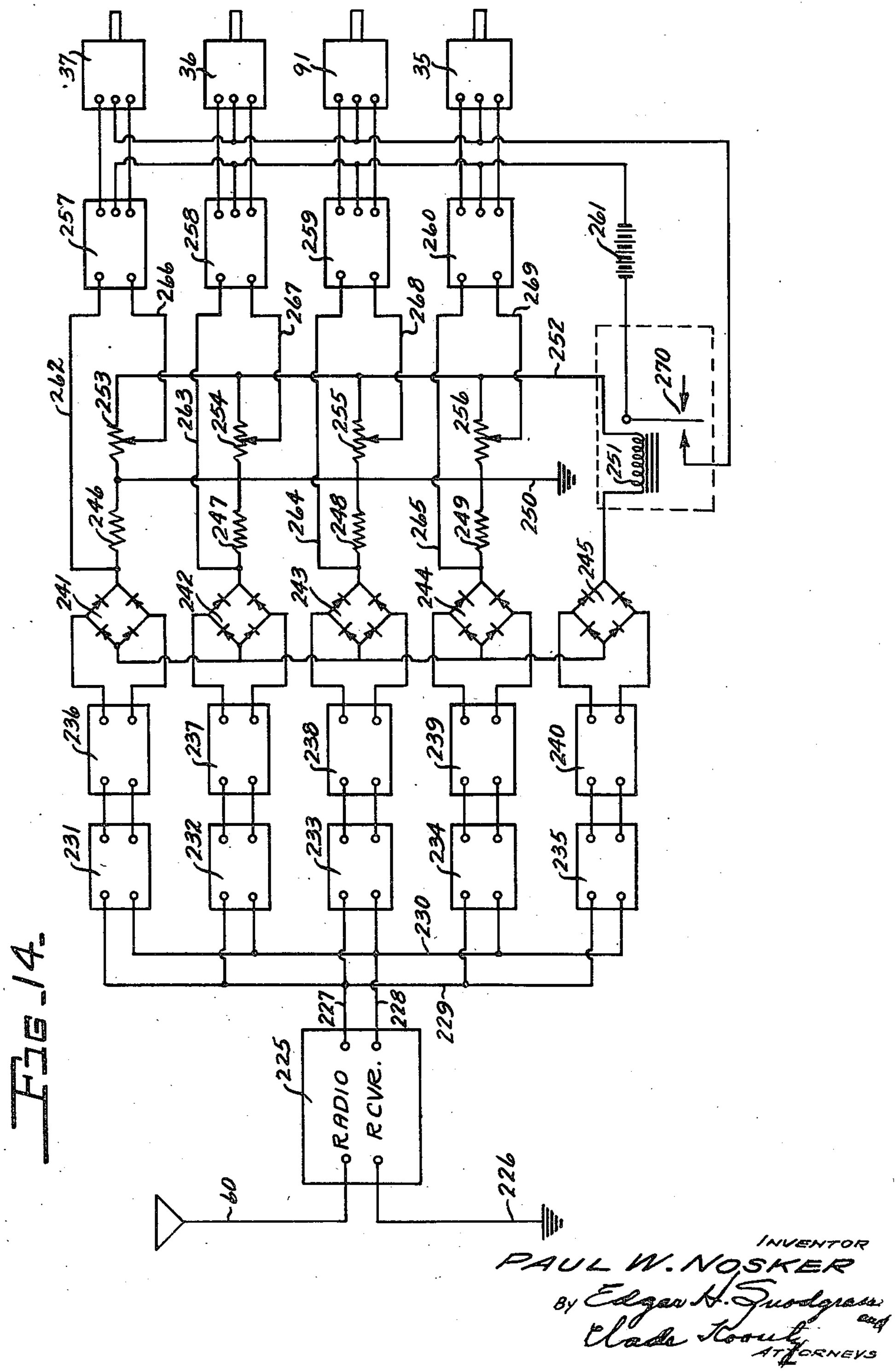
Figures 13, 16:
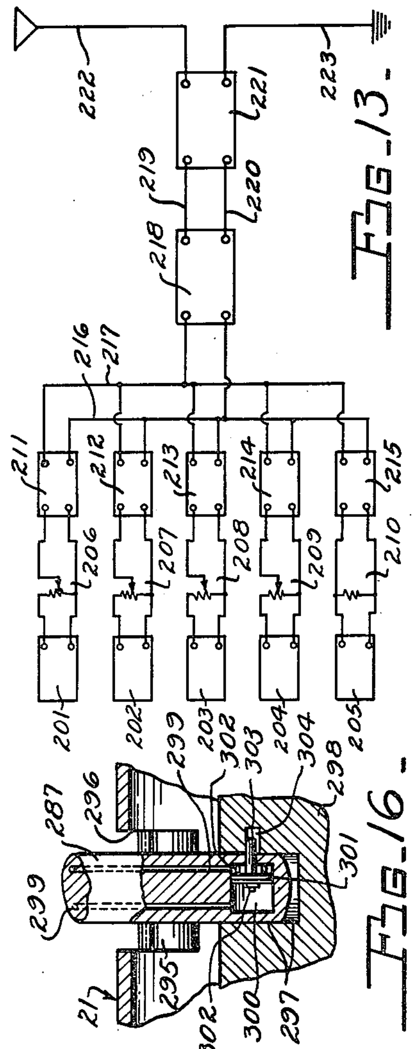
Figure 17:
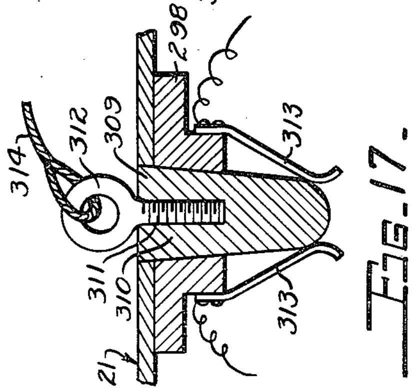
Figure 15:
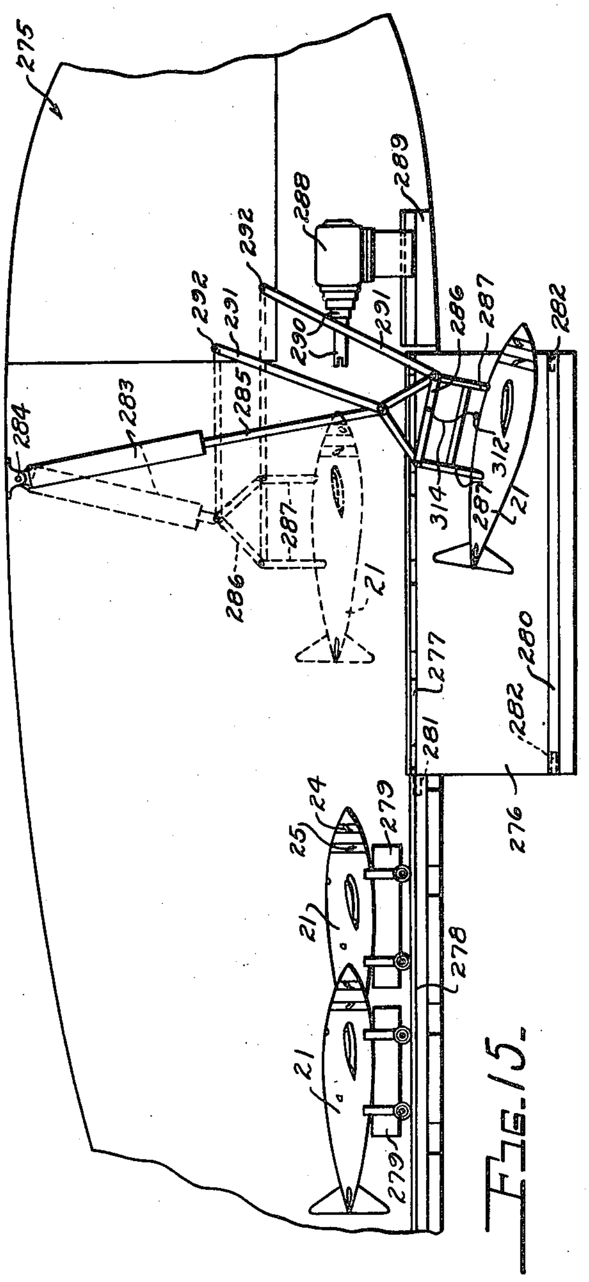

Figs. 4*a* and 4*b* together comprise a wiring diagram showing all the control circuits except the transmitting system;

Fig. 5 is a diagrammatic view in elevation of the circuit-selecting switch and servo-motor;

Fig. 6 is a detail in elevation of one of the circuit-selecting commutators;

Fig. 7 is a sectional view of one of the pendulous devices used to control banking;

Fig. 8 is a section on line 8—8 of Fig. 7;

Fig. 9 is a diagrammatic view of one of the servo-motors and position-selecting potentiometers for controlling the elevators;

Fig. 10 is a detail in elevation of the potentiometer of Fig. 9 per se;

Fig. 11 is a sectional elevation, somewhat diagrammatic, of one of the directional radiation receivers employed to control the aerial torpedo;

Fig. 12 is a section on line 12—12 of Fig. 11;

Fig. 13 is a wiring diagram of the preferred transmitting system for radio or remote control of the torpedo;

Fig. 14 is a wiring diagram of the preferred receiving system for radio or remote control of the torpedo, omitting the detonating and infrared ray-controlled circuits which are shown in Figs. 4*a* and 4*b*;

Fig 15 is a diagrammatic section of an airplane equipped with means for starting and launching the torpedoes, an alternate position of certain parts being shown in dotted lines;

Fig. 16 is a detail in section showing the means for locking the torpedo to the torpedo-launching mechanism; and Fig. 17 is a similar view showing diagrammatically a means for starting the clock switch as the torpedo is launched.

*General description of the torpedo*

The preferred embodiment of the invention has the general appearance of a monoplane, with a fuselage 21 having an armored pointed nose 22, wings 23, tandem propellers 24 and 25 in dual rotation (so called contra-propellers), power plant 26, ailerons 27, horizontal stabilizers 28, vertical fins 29, elevators 30 and rudders 31. A gear box 32 is interposed between the power plant and the propellers to give the desired speed reduction and to effect dual rotation, i. e., simultaneous rotation of propellers at equal speeds in opposite directions. Adjacent the armored nose 22 is a heavy explosive charge 33 which may be detonated. Additional explosive charges (not shown) may be distributed in any spaces available in the body of the torpedo. As the device is designed to be automatically destroyed in the event it fails to strike its target, hence will never land after launching, no landing gear is provided; and as it is pilotless, there is no pilot's compartment or cowling to increase the drag. The fuselage is designed for extreme high speed performance and should not greatly exceed nine feet in length, with a wing span of not more than six feet. It may be built principally of plywood or plastics or other light, strong material. The dual rotation propellers (affording the advantages of freedom from torque and gyroscopic reaction upon the body) should be of fixed pitch designed for optimum efficiency at or near the high speed of the aerial torpedo, and preferably are not over 4.0 feet in diameter, which means that the tip speed will be about 810 F. P. S., assuming a crankshaft speed of 6000 R. P. M. and a gear reduction of 2:1. The propellers may be of laminated wood, the fuselage of plastics, wood or metal, and the wings predominantly of plastics and wood or some other non-metallic material to permit installation and effective use of a radio receiving antenna (to be described) extending spanwise within the wings. A half wave antenna would be shorter than the wing span if a suitably high frequency of radio carrier wave were employed, and installation of such an antenna inside of the wing covering is preferred because this would obviate the drag caused by any external arrangement.

For the power plant a horizontally opposed, two cycle, 8 cylinder, marine type engine, developing at least 125 brake horse power at sea level and 6,000 R. P. M., is preferred. However, crankshaft speeds up to 7,000 R. P. M. are feasible, as is shown in the art of two cycle marine engines built for racing. The ignition system is preferably dual and energized by a battery and completely shielded to obviate radio interference. Breaker points actuated by cams mounted on the crankshaft, as in a marine engine, may fire the cylinders in proper sequence. Fuel delivery should be by an engine-driven pump, with dual carburetion, and cylinder charging by crankcase compression. Lubrication may be of the splash and spray type, and the cooling system is preferably of the liquid type with ethylene glycol coolant, circulated by an engine-driven pump through a skin radiator built into the wings (to reduce drag). All these power plant details are omitted from the drawings because they are not part of the present invention. Assuming a gross weight of the aerial torpedo armed and completely fueled, of 500 lb. (although by careful designing it may be nearer 400 lb.) the described power plant and propeller arrangement will drive the aerial torpedo at approximately 400 M. P. H. at sea level, and the maximum rate of climb at sea level will be 3,070 ft. per min. If a 16 cylinder X type engine were employed, the brake horse power would be doubled without any significant increase in overall dimensions of the fuselage and the speed would be raised to approximately 500 M. P. H. at sea level. The maximum rate of climb will be approximately 4,450 ft. per minute at sea level, if the weight is reduced to 400 lb. and the brake mean effective pressure equals 76.3 lb. per sq. in.

For high perforance at high altitudes some form of supercharging, such an exhaust-driven or geared blowers, may be employed, or oxygen could be fed into the induction system of the engine either from a liquified oxygen supply (heated by a heating chamber in contact with a portion of the exhaust manifold) or from some reducible compound of oxygen such as trinitrophenol (picric acid), $C_6H_2'OH(NO_2)_3$, which may be mixed with the fuel (high octane gasoline) at ordinary temperatures and hence would not require a separate tank or injection system. While picric acid is definitely destructive in its effects on the cylinder walls etc., it is a more efficient source of oxygen than liquified oxygen cylinders and saves space and weight, hence is preferred, especially as the the engine need not have a useful life of more than 20 minutes (136 miles), and in the case of the 16 cylinder engine for speeds of 500 M. P. H., may not have a useful life of more than 10.2 minutes (85.6 miles). In any event, sufficient oxygen should be made available for complete combustion of the full normal fuel charge on each power stroke, and the smallest possible fraction of the power output should be sacrificed in the supercharging process. There is no engine speed control or throttle adjustment, since the engine is to be operated at high speed throughout its useful life.

It is contemplated that the aerial torpedoes of my invention usually wil be launched either from a large cargo-type airplane or from a dirigible. Special launching gear, one form of which is described herein, may facilitate moving the torpedoes out of the dors of an airplane or dirigible against wind resistance etc. The torpedoes may be carried partially disassembled, e. g., with wings and propellers detached, and may be assembled immediately prior to launching. Of course, the torpedoes also may be launched from the ground or from vessels at sea.

*Automatic control system for straight flight*

To maintain the torpedo, once launched, in straight, level flight, three servo-motors are provided, motor 35 for controlling the ailerons, motor 36 for controlling the rudders and motor 37 for controlling the elevators. Details of the controls operated by these motors are shown in Figs. 4*a* and 4*b*.

Servo-motor 35 (Fig. 4*b*) has a reduction gear train (not shown) for driving a control cable real (not shown) by which the unillustrated control cables for ailerons 27 are moved in reverse directions. The arrangement may be exactly the same as the arrangement described below for controlling the elevators. To operate the ailerons automatically, there is a pendulous device 40 comprising a pivoted vane 40*a* oscillating between two contacts (not shown) electrically connected by leads 40*b*, 40*c* to the aileron servo-motor 35. Pendulous device 40 is essentially an acceleration-responsive reversing switch for controlling the ailerons and hence the banking of the aerial torpedo, and it tends always to maintain a resultant force on the torpedo acting in a plane that is perpendicular to the spanwise direction. A lead 40*d*, connected with vane 40*a*, and a lead 40*e* connected with servo-motor 35, complete the circuit of said servo-motor and its reversing switch 40. The rudder or rudders are likewise operated by a cable (not shown) and are moved in opposite directions by servo-motor 36, the arrangement being the same as that for servo-motor 35 except there is no pendulous device acting responsive to changes in acceleration. Instead a gyroscopic turn controller 41 is connected by leads 42*a*, 42*b* to servo-motor 36 which operates the rudder to apply a proper correction each time any air current, etc., tends to deflect the torpedo from a straight path. A lead 42*c* couples the gyroscopic turn controller 41 to a circuit-selecting switch 90 to be described.

To maintain a predetermined pitch of the longitudinal axis of the torpedo with respect to the horizon, a pendulous device 43 is provided. This pendulous device comprises a housing 44 (Figs. 7 and 8), vane 45 suspended within the housing from pivots 46 so as to swing through a small angle, adjustable contacts 47 between which the vane may oscillate, insulated holders 48 for the contacts, and leads 49*a*, 49*b*, electrically connecting the contact points and vane 45 with the reversible servo-motor 37 for the elevators. A lead 59 (Fig. 4*b*) connects the pivots 46 of vane 45 with the lead 42*c* which connects with the selecting switch 90. When vane 45 touches one of the contacts 47 it closes a circuit including servo-motor 37 which causes that motor to start, turning a pinion 50 (Fig. 9) which meshes with a gear 51 on a countershaft 52, said countershaft being journaled in a housing 53 adjacent the servo-motor. Fixed to countershaft 52 is a pinion 54 driving a gear 55 on another countershaft 56 which extends outside housing 53. On the outer end of countershaft 56 is a control cable reel or grooved pulley 57 over which a cable 58 is passed. Cable 58 is attached to the elevators 30 by means not shown to move them to change the pitch of the longitudinal axis with respect to the horizon. When vane 45 touches the other contact, the servo-motor 37 is reversed to move the elevators in the opposite direction. The gear train 50, 51, 54, 55, is merely diagrammatic to illustrate the working of the device; in actual practice the gear train may be quite different, involving perhaps a worm gear and a sector gear (not shown). Servo-motors 35 and 36 operate the ailerons and rudders respectively by mechanisms similar to the arrangement just described.

The two pendulous devices 40, 43 and the gyroscopic turn controller 41 are shown diagrammatically because they are not claimed per se herein and because various forms of regulating devices of this character may be used. They will operate automatically to keep the aerial torpedo on a substantially straight and level or preset climbing or diving course, once it has been launched, until other controls take over the guidance of the torpedo.

*Remote control by operator*

Often it will be desired, especially in daylight operations, to direct the course of the aerial torpedo entirely by radio waves under the control of an operator in flight or on the ground; or where there are extensive fortifications with intercommunicating observation and control stations, several operators may take turns in controlling one or a series of the torpedoes as they flash into and fade out of sight. An antenna 60 (Fig. 4*a*) is located inside the wings 23 for the reason already stated. Connected to antenna 60 is a radio receiver 61 to which four band pass filters 62, 63, 64, 65 are connected in parallel by leads 66, 66*a*, 67 and 67*a*. Each of the band pass filters is also connected to a rectifier (which may be of copper oxide or some other type) whereby only direct current is passed on to the controlling relays for the servo-motors. The four rectifiers 68, 69, 70, and 71 are each connected in parallel to a conductor 72 which is connected to a lead 73 forming part of a separate circuit (to be described) coupled to the radio receiver.

Band pass filter 62 is connected in the detonating system which will be described hereafter. Band pass filter 63 and its rectifier 69 are connected with a potentiometer 75 including a resistor 76, said potentiometer having relatively movable contacts to cut in or cut out resistance. A relay 77 is connected to potentiomenter 75 and servo-motor 37. Preferably the arrangement is such that servo-motor 37 operates the movable contact of potentiometer 75, or what is the same thing, a movable resistance coil against a stationary brush providing the contact. The potentiometer 75 may be as diagrammatically illustrated in Figs. 9 and 10 where reversible motor 37 is shown adapted to rotate resistance coil 78 mounted on an insulator 79 which is keyed or otherwise secured to countershaft 56. Resistance coil 78 is in contact with stationary brush 80 in brush-holder 81. With this arrangement the total angular movement of the potentiometer coil 78 is equal to the total angular movement of the control cable reel 57. In exactly the same way, reversible servo-motor 36 for the rudder rotates the coil (not shown) of a potentiometer 82 (with resistor 82*a*) connected through rectifier 70 to band pass filter 64. Relay 84, exactly like relay 77, is interposed between servo-motor 36 and potentiometer 82. Relays 77 and 84 are each polarized and zero center, as indicated, and a wire 85 connects both relays in parallel with a lead 86 connected to the radio receiver 61 to form part of a separate coupled circuit as will be described.

As indicated above, the control system of my invention may be purely automatic to maintain straight line level flight, or straight line climbing or diving flight, or it may respond to radio signals, or it may react to infrared waves to guide the aerial torpedo toward the source of said waves. In order to switch rapidly from one control arrangement to another, a circuit-selecting switch 90 is provided and a reversible servo-motor 91 is employed to move relatively movable contacts to switch the circuits. Preferably the same servo-motor operates the relatively movable contacts of a potentiometer 92 having resistor 92*a* and receiving direct current impulses from rectifier 71 which is connected to band pass filter 65. A polarized relay 93 is also connected to servo-motor 91 and to potentiometer 92 and by means of wire 94 said relay is connected with lead 86 extending to radio receiver 61. The three potentiometers 75, 82 and 92 have their resistors connected in parallel with lead 73.

Referring to Figs. 4*a*, 5 and 6, the circuit-selecting switch 90 is so interconnected with other parts of the wiring system as to control the switching from automatic to remote or radio wave control, or alternatively to infrared control. Accordingly the circuit-selecting switch has two circuit-selecting commutators 99, each consisting of a circular insulating contact support 100 and three spaced contact segments 101 on the periphery of support 100. These commutators are fixed upon a countershaft 102 rotated in reverse directions by servo-motor 91 acting through reduction gear train 103, 104, 105, 106, the latter being a pinion directly connected to the motor-shaft 107. The coil of potentiometer 92 is also rotated by countershaft 102. Stationary brushes 108, 109, 110 held in insulating holders 111, 112, 113 respectively are adapted to contact the potentiometer coil and commutators 99, respectively. Leads (not shown) are connected to brushes 108, 109, 110 respectively and other leads, also omitted, are connected to the several commutator segments. Obviously there are three commutator segments 101 because there are three control circuits to be selectively activated by means of the circuit-selecting switch, and two commutators 99 are employed, since there are positive and negative sides to each of the three circuits controlled through said switch.

Remote control is effected preferably by means of a modulated continuous radio wave carrying four single modulating frequencies in non-harmonic relationship and of suitable value to be passed respectively by the band pass filters. The controlling effect is obtained by varying individually the percentages of amplitude modulation on the carrier wave due to each of the four modulating frequencies. The coils in potentiometers 75, 82 and 92 each have a definite position for every given percentage of modulation on the particular modulating frequency; therefore the rudders, elevators and circuit-selecting switch each have a definite position, and perfect control is obtainable when the parts are properly adjusted.

To clarify this action, the operation of the channel through band pass filter 65 will be described. The modulating frequency passed by filter 65 is rectified at 71 and the resulting direct current is passed through the potentiometer 92 and the resistor 92*a*. The polarized and zero center relay 93 is so connected as to be actuated by the potential drop between the movable contact on potentiometer 92 and the lead 72 common to all the rectifiers. Thus any signal appearing in the output of filter 65 will tend to actuate the relay 93 in one particular direction, and the relay will close in that direction if the amplitude of signal is sufficient. However, the output from the radio receiver through the coupled circuit formed by leads 73, 86 gives a direct potential having an amplitude that is proportional to the intensity of the energy received by the antenna, and this direct potential is applied to relay 93 in such a manner as to oppose the potential from the rectifier 71. It is evident, therefore, that for each setting of the potentiometer 92 there is a given percentage of modulation on the frequency of the filter 65 that will cause zero current through the relay coils and hence will create a state of electric equilibrium. If the modulating signal on the frequency of filter 65 is increased in amplitude while the carrier wave intensity remains unchanged, the relay will close in one direction to start the reversible servo-motor 91, but if the signal from filter 65 is reduced the relay will close in the opposite direction to start motor 91 in the reverse direction. Now, as previously explained, servo-motor 91 turns a potentiometer 92 at the same time it turns the commutators 99 of the circuit-selecting switch, and the direction of the turn is such that the system tends always to seek its equilibrium position for every given amplitude of modulating signal. Thus the final position assumed by the system can be adjusted at will by the remote operator who is provided with the necessary transmitter controls to vary separately the modulation percentages due to each of the several modulating frequencies.

As stated above, the automatic control system for straight flight is in operation only when the circuit-selecting switch 90 is in the central position bridging central contacts 101, as shown in Fig. 4*a*. When the circuit is closed through the contacts 101 on the right hand, the automatic control system is disconnected and the remote (radio) control system is made effective. When the circuit is closed through the contact 101 on the left, the automatic control system is disconnected and the automatic directing (infrared) system is made operable.

While not mentioned heretofore, I have shown amplifiers 117, 118, 119, 120 interposed between the band pass filters and the rectifiers. However, these amplifiers may be coupled between the rectifiers and the relays or I may employ two sets of amplifiers, one set on either side of the rectifiers, if found necessary either for securing sufficient gain or for providing total isolation of the circuits. These arrangements are readily understood without illustration. Evidently such amplifiers would in no way alter the character of the control circits, and neither would they change the final results achieved.

Theoretically, of course, the described radio control system can be subjected to interference or blanketing by enemy action, if we assume that the enemy is completely informed about the method of control being used and is close enough to effect such control. However, the system disclosed herein has a complexity and flexibility such that no enemy could interfere with it, except accidentally, in the short period during which the serial torpedoes are in flight. In the first place, the carrier frequency for the remote control does not need to be the same for any two torpedoes, but can be set as desired immediately before launching. Thus neither the launching crew nor the remote operator would necessarily know in advance the actual frequency to be used. Secondly, since the remote control is accomplished not by the presence or absence of the radio frequency carrier wave, but rather by modulation imposed upon that carrier, the modulation frequencies used for control purposes could be similarly adjusted individually and immediately prior to launching. Hence even if the enemy could discover the carrier frequency being used, it is extremely improbable that he could accurately measure and then reproduce, in a proper manner, and with necessary relative amplitudes, the several modulating frequencies required to effect control of the torpedo. The problem of intentional interference or blanketing is made especially difficult because of the fact that the total flight time of any one torpedo is less than half an hour, and by the further fact that remote control need be used only intermittently and during a very small fraction of the total flight time.

Instead of the rectified carrier signal taken from the output leads 73, 86 from the radio receiver, a fifth modulating frequency of constant amplitude could be impressed upon the transmitted carrier wave and rectified after reception to produce the opposing potential for sense determination of relay motion. This use of a fifth modulating frequency would not change the performance of the remote control portions of the circuit, but it would furnish a simple and convenient means of obtaining the necessary direct potential in a relatively low impedance circuit such as is often desirable for efficient relay operation. The preferred arrangement is shown in Figs. 13 and 14.

In Fig. 13, five signal generators 201, 202, 203, 204, 205 are shown, each of which produces electrical impulses (preferably pure sine waves) of adjustable amplitude but of different frequency. The outputs of signal generators 201, 202, 203, and 204 are fed respectively to variable attenuators 206, 207, 208, 209, and thence through amplifiers 211, 212, 213, and 214 respectively to a mixing circuit comprising leads 216, 217. The output of a signal generator 205 is fed to the same mixing circuit through fixed attenuator 210 and amplifier 215. Instead of the amplifiers other irreversible coupling devices may be used. The combined signals emerging from the mixing circuit are carried to a mixer and modulator 218 and then through leads 219, 220 are conducted to radio transmitter 221 having the usual connections with antenna 222 and ground 223, so that the signals may be impressed upon a radio-frequency carrier wave for transmission in space.

Now referring to Fig. 14, antenna 60 is coupled to a radio receiver 225 having a ground 226. This receiver is connected by leads 227, 228 to conductors 229, 230 connecting band pass filters 231, 232, 233, 234, and 235 in parallel. Combined signals received by the antenna, after demodulation, are separated by the filters and are then amplified by amplifiers 236, 237, 238, 239 and 240 respectively. Instead of amplifiers other irreversible coupling devices may be used, and if desired, amplifiers may be used also on the receiving sides of the filters. The output of each amplifier is delivered to a rectifier; hence there are five rectifiers 241, 242, 243, 244 and 245. The first four of these rectifiers are each directly connected to a fixed load circuit, here represented by the resistances 246, 247, 248, 249, to each of which a ground wire 250 is connected. On the other hand rectifier 245 is connected to a circuit which comprises a solenoid 251 and a lead 252 to which potentiometers 253, 254, 255 and 256 are coupled in parallel.

The reversible servo-motors 37, 36, 91 and 35 as already explained move the movable contacts of the potentiometers 253, 254, 255 and 256 respectively. Thus Fig. 14 differs from Figs. *4a* and *4b* where only three motor driven potentiometers are shown. Returning to Fig. 14, the servomotors are shown coupled with bi-directional, polarized, zero center relays 257, 258, 259 and 260 and are connected in parallel with a source of electric energy, e. g., battery 261. Shunts 262, 263, 264 and 265 connect each relay with the output side of the corresponding rectifier 241, 242 etc., and leads 266, 267, 268 and 269 complete the circuits through the potentiometers. The armatures (not shown) of the several relays 257, 258 etc., will assume the central or "zero center" position to stop the corresponding servomotor when the difference of potential between the armature terminal is zero. However, any other difference of potential causes the relay armature to close in one direction or the other to cause the corresponding servo-motor to rotate in one direction or the other to move the torpedo control accordingly. Thus the position of the electrical null point on each potentiometer at any particular time determines the control setting that will be accomplished automatically.

To effect a change in the position of the electrical null point on any of the potentiometers, hence to control the torpedo, it is necessary only to adjust one of the variable attenuators 201 etc., (Fig. 13) to vary the amplitude of the transmitted signal for the channel involved. If an attenuator is shifted to increase the amplitude of a certain transmitted signal, the motor that is controlled (as described) by that signal will operate in such a direction as to move the contact of the potentiometer nearer to the ungrounded side of that potentiometer. Conversely if the attenuator is readjusted to reduce the amplitude of the same transmitted signal, the motor will operate in the opposite direction.

In the preferred method the several signal generators 201, 202, etc., are adjusted to have equal amplitudes of output, and the modulator 218 is arranged to produce 100% modulation of the radio frequency carrier wave when each attenuator is set for maximum amplitude of transmitted signal. The receiving system of Fig. 14 is so adjusted that the voltage across each potentiometer is at every instant equal to the voltage that would exist simultaneously across any one of the load resistors 246, 247, etc., if the corresponding attenuator were set for maximum amplitude of transmitted signal.

Additional relays, such as relay 270 (Fig. 14) may be incorporated in one or more of the channels to accomplish other controlling functions of an on-off or stepping type. Furthermore, by employing selectively any one of several standard frequencies for the constant-amplitude reference signal, using relays in the position of relay 270 to switch the polarized relays to different sets of servo-motors and potentiometers for each case, it is possible to shift from one group of controls to another and thus to accomplish settings of many different controls in rapid succession.

In lieu of a fifth modulating frequency, two different carrier frequencies could be employed. In such a system one of the carrier waves would be modulated at constant level by all of the several control frequencies. The other carrier wave would be modulated by the same frequencies, but each of these modulation components would be independently adjustable in amplitude and would be alterable in phase by increments of 180° with respect to the similar modulation component of the first mentioned carrier wave. After reception and filtering, each modulation frequency would be employed to operate a relay by means of a bucking circuit similar to those shown in Fig. 4*a*. Equilibrium deflection of the control mechanism actuated by any given relay would thus be established by comparison of amplitudes of its particular modulation frequency on the two different carrier waves. Sense determination of the control movement from neutral position would be provided by a phasing network similar to the one disclosed in my pending application Serial No. 401,634, filed July 9, 1941, now Patent No. 2,338,732.

The principle of the double carrier wave described above would possess the advantage of being extraordinarily difficult for an enemy to duplicate. For an enemy to gain control of the aerial torpedo, it would be necessary to know not only the two carrier frequencies being employed, but also the several modulating frequencies imposed upon those carriers, the proper correlation of each of the modulating frequencies with its particular operation on the torpedo, and the relative amplitudes and phases of the several modulations required for the desired results. It is possible that enemy action might discover one or more of these factors, but it is not reasonable to suppose that several of them could be measured and properly reproduced by an enemy during the extremely short period that would be available for the purpose.

*Infrared ray control*

Figures 1, 2, 3:
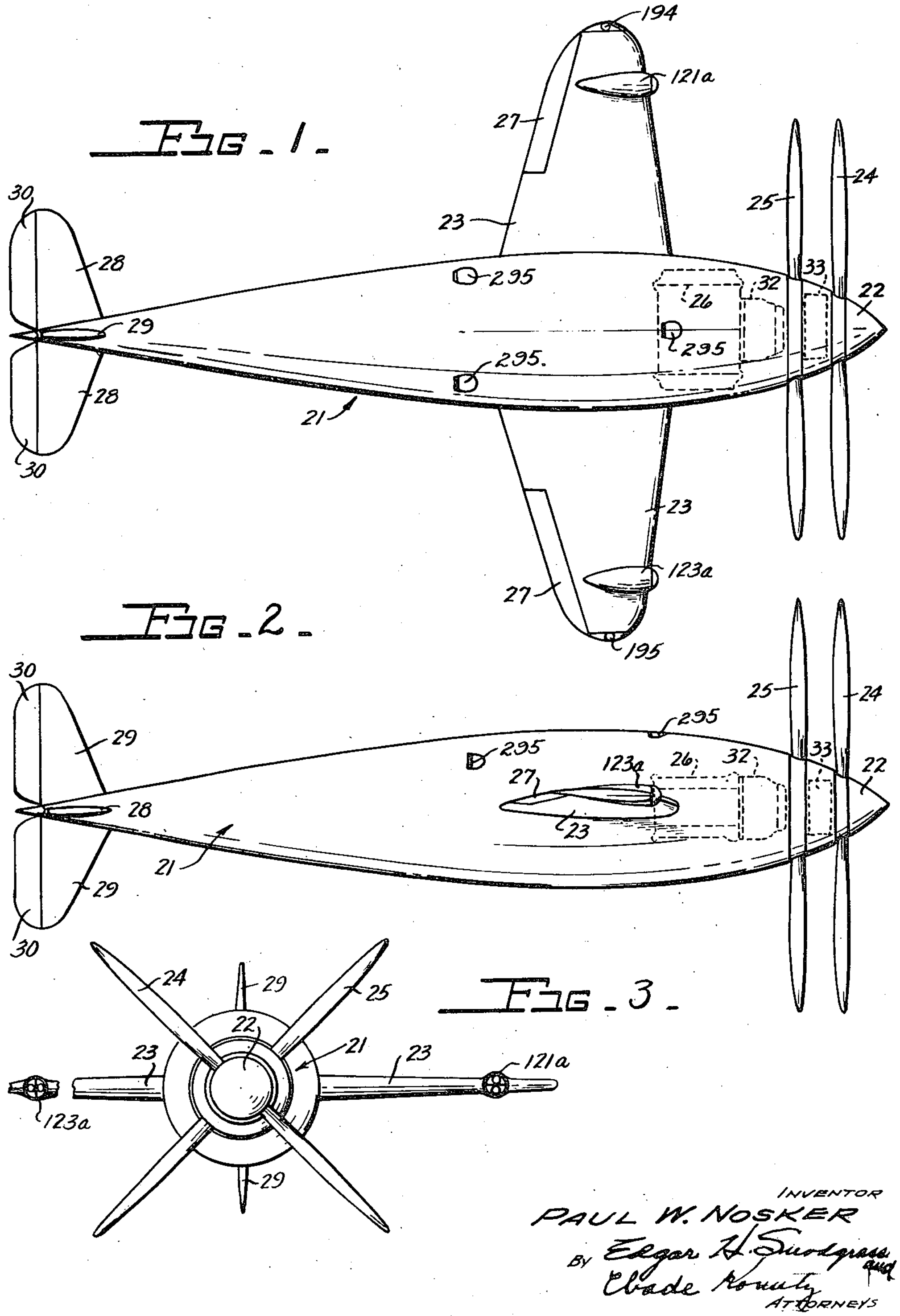
Fig. 1 is a plan view of the aerial torpedo.
Fig. 2 is a side elevation of the same.
Fig. 3 is fragmentary front elevation of the same.

While remote control is essential, it may be unusuable under certain conditions, e. g., at night or in heavy clouds or dense fogs when visibility is only a few yards. At such times when known defense weapons are useless, the torpedo of my invention may be employed to great advantages, since it will seek out the enemy, because part of the control system receives and interprets infrared radiation emanating from all operating airplanes. The automatic directing system which is responsive to infrared rays comprises a pair of vertical thermocouples 121, 122 (Fig. 4*b*) adapted to control the elevators, and a pair of horizontal thermocouples 123, 124 adapted to control the rudder or rudders. As shown in Fig. 3, these pairs of thermocouples may be mounted within housings 121*a*, 123*a*, respectively located at the leading edges of wings 23. Each pair of thermocouples is connected into a channel that is identical with the channel of the other pair, so that it is necessary to explain the operation of only one channel. Thermocouples 121, 122 are connected to separate primary coils of an electro-mechanical transformer 125 (to be described) in which the mutual inductance of the primary coils with respect to a center-tapped secondary coil is variable in some periodic manner by means of energy supplied from an external source.

The electro-mechanical transformer 125 (Figs. 4*a* and 11) has two separate field windings energized by thermocouples 121, 122, and the phase relationship of these two field coils is maintained such that zero potential difference is induced in the secondary coil when the currents in the two thermocouples are equal. Associated with the electro-mechanical transformer is an alternating current generator 126 having primary winding 127 which is energized by some constant current source, indicated in the diagram as a battery 128, and which is coupled to a separate secondary winding 129 that is unrelated to the center-tapped secondary previously mentioned. This third primary 127 with its secondary 129 constitutes a separating alternating current generator, the sole function of which is to supply an alternating potential of constant amplitude having the same frequency as that produced across the center-tapped secondary, and maintaining a constant phase relationship to that across the center-tapped secondary. Whenever the radiation received by one of the thermocouples 121, 122 is more intense than that received by the other, the thermocouple currents are unequal, and an impulse or signal will then be transmitted to a conventional alternating current amplifier 130; but when the thermocouple currents are equal, no electrical energy reaches the input side of the amplifier.

The electro-mechanical transformer 125 converts an extremely small direct E. M. F. from the thermocouples to a higher E. M. F. (A. C.) that is led to the input side of the amplifier. Heretofore it has been proposed to transform a small direct E. M. F. as from a thermocouple to a higher alternating E. M. F. by connecting the thermocouple to the primary of a transformer and then moving said primary relative to a stationary secondary (connected to an amplifier) by power driven means. This principle is utilized in the transformer 125 to be described.

In Figs. 11 and 12, a directional radiation receiver is shown comprising a transformer housing 132 which encloses the electro-mechanical transformer 125 comprising a stationary center-tapped secondary coil 133, a pair of rotating primary coils 134, 135, shafts 136, 137, respectively for the rotating primary coils, like gears 138, 139, fixed on said shafts and meshing with driving gear 140 which is driven by motor 141. Thus the primaries are in constant phase relationship to each other. Laminated pole pieces 142 increase the magnetic field as is known in the art of transformers. Vacuum thermocouples 121, 122 are mounted on shafts 136, 137 respectively, and are electrically connected with respective primaries, as indicated in Fig. 4*b*. Shields 145, 146 are placed around the thermocouples in such a manner that each thermocouple can receive radiant energy only from points lying within a forward field that is wholly on the same side of the horizontal axis of symmetry of the assembly. In this way the current in primary coil 134 is a function of the total radiation received from the area in front of the thermocouples and below the horizontal plane of symmetry, while the current in primary coil 135 is a function of the total radiation received from regions in front of the thermocouples and above this horizontal plane of symmetry. Shields 145, 146 or their equivalent are essential to prevent the thermocouples from being affected and perhaps rendered useless by the relatively intense infrared radiation of the nearby power plant of the torpedo itself. The alternating current generator 126 is located in a housing 147 bolted to the transformer housing and is directly driven by motor 141. Field coils 148, armature 149 and slip rings 150 are illustrated. Leads (not shown) are connected to the slip rings and conduct away an alternating current of constant amplitude, frequency and phase. It will be noted that the generator is driven at the same speed as the transformer primaries, gears 138, 139 and 140 being of equal size.

When the primary coils 134, 135 are rotated, alternating flux is induced in the laminated pole pieces 142. As these primary coils are so driven and arranged as to produce magnetic fields which are at all times 180° apart in phase, the total flux in the core of the stationary secondary coil 133 is determined by the difference between the flux due to primary coil 134 and that due to primary coil 135. It follows that the E. M. F. induced in the secondary coil 133 will be zero if the electric and magnetic portions of the transformer are symmetrical about its center and if the currents in the two primaries are equal. On the other hand, any inequality in the primary currents will induce in the secondary an E. M. F. having a magnitude that is proportional to the difference between those currents and having a phase that depends upon which of the primaries is carrying the greater current. The primary currents are separately determined by the amounts of radiation received by the thermocouples 121, 122 and therefore any inequality of radiation received by these thermocouples will produce an E. M. F. in the secondary coil, from the phase of which the sense of the radiation inequality can be determined Generator 126 is the source of phasing current used for this sense determination, and its field coils 148 are excited by battery 128 shown only in the wiring diagram, Fig. 4*b*.

By the described attachment of the thermocouples to the shafts of the rotating primary coils of the transformer, the necessity for slip rings, brushes and other movable electric contacts in the primary circuit is obviated, and the possible disturbing effects and losses due to variable contact potential and contact resistance are eliminated because a continuous electric circuit is maintained at all times. Rotation of the thermocouples is required under this system, but if the thermocouples are properly designed and are suitably mounted in vacuum, (not shown) this will not be detrimental. Another valuable feature of the directional radiation receiver is the incorporation of iron in its magnetic circuits in such a manner that no portion of this iron is in motion relative to the secondary coil. When used in this manner, the iron would produce comparatively high magnetic coupling between the primary and secondary coils without subjecting the system to interfering effects when in the presence of constant magnetic fields.

When a signal or impulse from the thermocouples 121, 122 reaches the center-tapped secondary 133, it is amplified by the amplifier 130 (Fig. 4*b*) and is then impressed upon a push-pull circuit consisting of a dual-triode vacuum tube 151 and a center-tapped plate circuit 152 with load resistors 153, 154 and potentiometer 155. The plate voltage for the vacuum tube 151 is supplied by battery 156 having one lead connected to the adjustable contact 157 of potentiometer 155, while the other lead 158 is connected to the cathode circuit of the amplifier 130. The grid return circuit 159 of vacuum tube 151 is carried through the single secondary of transformer 125. The entire push-pull circuit is so adjusted as to be symmetrical about its electric center. Thus the network is somewhat like the one disclosed in my pending application Serial No. 401,634, filed July 9, 1941, its purpose being to provide a phasing method for determining which of the two thermocouples is receiving the greater incident energy at any instant. The balanced output circuit 152 of vacuum tube 151 is connected across the coils 160*a* of the polarized zero-center relay 160 that controls servo-motor 37 through leads 49*a*, 49*b* to operate the elevators. The operation of relay 160 is such that motor 37 is stationary at all times when the currents in the vertically displaced thermocouples 121, 122 are equal. However, if thermocouple 121 receives greater radiant energy than 122 and consequently passes a greater current through primary coil 134, relay 160 closes in one particular direction. On the other hand if thermocouple 122 receives greater energy than thermocouple 121, the phase of the signal passing through amplifier 130 is changed by 180° and the relay closes in the opposite direction. Thus the motor which operates the elevators moves until the intensity of radiation on one thermocouple equals that on the other, at which time the torpedo will be headed directly toward the source of infrared rays.

The horizontally displaced thermocouples 123, 124 similarly operate through a transformer 161 and generator 162, amplifier 163, vacuum tube 164, resistors 165, 166, potentiometer 167, relay 168, and leads 169, 170 which connect with leads 59*a*, 59*b* to control the rudder-operating motor 36. Another lead 170*a* connects the armatures of both relays 160, 168, with the circuit-selecting switch 90. As long as equal intensities of radiation fall upon thermocouples 123, 124, the rudder will not be moved, but any inequality in the intensity effects rudder movement such as will tend to turn the torpedo constantly toward the source of radiation.

*Detonation control*

In accordance with the invention, detonation of the explosive charge is effected (1) by collision of any part of the torpedo with an object, (2) by radio waves under the control of an operator, (3) by stopping or slowing down of the power plant, or (4) by infrared rays from a source other than the power plant of the torpedo.

In the preferred embodiment, detonation by collision will take place if any part of a grid 171 of fine insulated wire is broken. The grid is preferably strung internally (not shown) through the wings, fuselage and tail surfaces of the aerial torpedo, the arrangement being such that a glancing blow struck any object will inevitably break the grid and cause detonation as will now be explained. A detonator 172 of conventional construction is placed near the explosive charge 33 and is connected with a battery 173, having a lead 174 connecting it with a relay 175. The latter is directly coupled with a relay 176 whose magnetic coil 176a is joined electrically (by a lead 177) with grid 171. A safety switch 178, adapted to be closed just before the launching, and hence accessible from the exterior of the torpedo, is connected by a conductor 179 to relay 176 and is also coupled to the detonator by lead 180. When grid 171 is broken, solenoid 176a can no longer hold the movable contactor 176b of relay 176 and said contactor opens to detonate the explosive charge. The detonator is also connected by a lead 181 with a detonator relay 182 which is under direct radio control of the remote operator. Detonator relay 182 has a magnetic coil 182a connected by lead 183 with the output side of rectifier 68 and by lead 73 with radio receiver 61. As will be clear from the foregoing description, rectifier 68 delivers direct current to coil 182a when an impulse is passed by filter 62. This will cause movable contact 182b to close which in turn will detonate the charge. Thus at any moment in the flight of the torpedo it may be blown up at the will of an operator having knowledge of how to control the radio waves at the transmitting station (Fig. 13).

If the fuel supply is exhausted, the torpedo will cease its flight and start to fall out of control. To cause detonation as soon as the engine slows up or stops, a centrifugal contactor 190, which is a single pole, single throw switch governed by a momentum-responsive device similar to a flyball governor, is connected in the detonator circuit. Leads 191a, 191b join the centrifugal contactor with relay 175 and another lead 192 connects it through relay 199 with the circuit selecting switch, as shown. A third wire 193 connects the centrifugal contactor 190 with detonator 172 through the safety switch 178. Centrifugal contactor closes the detonator circuit to detonate the charge whenever the engine speed falls below a certain figure. Thus after its flight the torpedo cannot return to the earth unexploded. This is of considerable importance not only because the torpedo is too dangerous to be allowed to fall anywhere on friendly territory, but also because it should not be permitted to fall unexploded on enemy territory, as the capture of an intact torpedo would aid the enemy by revealing the details of its construction. While the collision grid will inevitably cause destruction of the torpedo when it hits any ordinary object, the possibility of a fall into marshy ground or on cushioning material such as hay or straw should not be ignored.

Finally, detonation may be caused by relatively intense infrared rays. A pair of thermocouples 194, 195 sensitive to infrared rays are carried on the wings 23 near the tips thereof and are connected to an electromechanical transformer 196 similar to transformer 125 and hence unnecessary to describe. An amplifier 197 and a rectifier 198 receive the small impulses from the thermocouples 194, 195 and build them up to magnified direct current capable of energizing the coil 199a of a relay 199 connected by lead 192 to the detonating circuit including relay 176. It should be made clear that the impulses from the thermocouples 194, 195 are added to make an impulse which is a function of the total radiant energy received by both thermocouples; in this respect the infrared detonating system is different from the infrared directing system which operates by means of a difference in radiant energy received by the thermocouple pairs 121, 122 or 123, 124. As the torpedo may narrowly miss its target and due to a lowered fuel supply may not again be maneuverable into a favorable attacking position, the infrared rays received upon close approach to the target should cause detonation, which will ordinarily effect disabling or destruction of enemy aircraft, since pieces of the torpedo will be blown in all directions.

Because the sun is the major source of infrared rays, infrared detonation will be prevented during daylight hours except under unusual conditions as when seeking out an unseen enemy known to be operating nearby in a fog or heavy storm obscuring the sun. To cut out the action of relay 199, lead 192 has a switch 200 which may be opened by an operator before launching the torpedo. Switch 200 will be located so as to be easily reached from outside the torpedo. Where daylight operations only are to be conducted, the entire infrared detonating and directing systems may be removed or omitted from the torpedo, and all the other parts will operate exactly the same, except that the range may be increased materially if additional fuel is carried.

To prevent detonation until after the torpedo is launched and well on its course, a clock switch 184 is connected by leads 185, 186 with coil 175a of relay 175 and is also connected by leads 187, 188, 189 with the circuit-selecting switch. The clock switch controls relay 175 through relay 176 and prevents the closing of any of the above described detonating circuits until the clock has measured a certain time interval, for instance 20 seconds, from the moment of launching. With this arrangement, detonation will be impossible until 20 seconds have elapsed, after which the torpedo will be "armed" and may be detonated in any of the ways described above. To start the clock of the clock switch, a circuit may be closed by pulling out a plug 309 (Fig. 17) driven into a recess 310 in a structural member 298 which is part of the torpedo. Said plug may have a central threaded bore 311 receiving a screweye 312 which may be inserted by a member of the launching crew immediately before launching. Plug 309 spreads apart spring contacts 313 which tend to close. A cable 314 attached to the screweye may be anchored to a part 286 (Fig. 15) of the launching mechanism to be described. As the torpedo leaves the launching mechanism under its own power, plug 309 will be jerked out, contacts 313 will meet and the clock will start running because of power derived from battery 315. See Fig. 4a.

*Torpedo launching*

Referring to Fig. 15, a cargo type airplane 275, only a part of which is shown, has conventional bomb-bay doors 276 hinged as at 277 and adapted to be opened or lowered by a hydraulic system not illustrated because well known. Fixed to the floor of the fuselage are rails 278 forming two or more tracks, and small cars 279, each carrying a torpedo, may move along said tracks to bring the torpedoes one at a time to a position over the launching opening. Clamps (not shown) may hold the cars and the torpedoes against movement until the time for launching. Each door 276 has one or more rails 280 fixed on its inner side and adapted to be alined with one of the rails 278 when the doors are closed, so that the tracks are continuous when the doors are closed. Exact alinement of the rails and locking of the doors may be accomplished by slidable pins 281 on the ends of each rail 278 adjacent the door opening, said slidable pins entering sockets 282 in the ends of rails 280. The cars 279 with their torpedoes are rolled one at a time over the rails and momentarily are supported by the doors. However, this extra load on the doors is quickly removed by lowering a torpedo-launching mechanism having means to connect with and support a torpedo, as will now be described.

The torpedo-launching mechanism comprises a hydraulic cylinder 283 with its upper end hinged as at 284 to the fuselage and having a piston rod 285 pivotally connected with and supporting a frame 286. Three parallel rods 287 form an extension of frame 286 and their lower ends are locked with a torpedo at three spaced points as will be described. With the torpedo rigidly held by the launching mechanism, a starting motor 288 is slidable on a stand 289 toward the torpedo and its automatically disengaging clutch 290 is coupled with propeller 24. The doors, meanwhile, have been opened and the torpedo with its propellers spinning will be quickly lowered by the hydraulic cylinder. To tilt each torpedo so that it will have a negative angle of attack for assured launching, one or more pairs of links 291 are pivotally connected to frame 286 at their free ends and at their opposite ends are pivoted as at 292 to the fuselage. The location of the pivots and the lengths of links 291 are such that frame 286 is turned through a small angle as the torpedoes are lowered.

As shown in Figs. 1 and 16, each torpedo has three hinged covers 295, each closing an opening 296 in the outer skin of the torpedo. Normally these covers remain closed under spring pressure to seal the openings to minimize drag. When one of the supporting rods 287 is thrust against a cover 295 it will open and permit the rod to be moved down into a socket 297 in the structural member 298. Each rod contains two hydraulic tubes 299 which may connect with a hydraulic system (not shown) similar to the door-operating system, or else a part of the latter, and in either case controlled by valves worked from the interior of the airplane. Near the lower end each rod 287 has a chamber 300 in which a hydraulic piston 301 reciprocates. Stops 302 on each side of the piston prevent it from moving too far in either direction. A locking pin 303, which may be fixed to piston 301, will enter a recess 304 in the structural member to lock the rod to the torpedo, when the piston is in one position. However, when the piston is moved in the other direction the pin 303 will move out of the recess to release the torpedo. When the rods slide out of the openings 296 the covers will close automatically.

The described launching mechanism delivers the torpedoes one at a time below the airplane, with a negative angle of attack so that they will clear the airplane when launched. Simultaneous releasing at all three points of suspension is effected. It will be understood that a number of torpedoes may be stored on racks etc. inside the airplane at various points. If desired, a small crane (not shown) may facilitate handling the torpedoes inside the airplane.

*General discussion*

From the foregoing it will be clear that the described aerial torpedo, within the limits of its flight radius, is capable of outclimbing and overtaking any bombardment or cargo-type plane in the world; and if it is brought close to the target and exploded, it will cause disablement or destruction of the target. Since the aerial torpedo is quite small and exceedingly fast, it will present a very difficult target to gunners of airplanes defending against attacks, and as it is unmanned it cannot be stopped by killing the pilot but only by disabling some of the controls or by actual destruction of the torpedo at some distance from the defending plane.

One serious limitation inherent in the design of the aerial torpedo is its short flying radius due to the small load of fuel which can be carried in the space available therefor. As this drawback cannot be obviated without lowering the performance characteristics, it is planned to carry one or more of these flying torpedoes in the bomb-bay of a converted bombardment type airplane and to release them when the enemy is sighted or his proximity is indicated by known detection devices. Then by radio impulses emanating from the carrier aircraft or if desired from some high-altitude observation plane or from a ground station, as the circumstances may dictate, the torpedo may be directed toward the enemy and when near such aircraft may be converted (at the will of the remote operator) into an automatic pursuing weapon which will overtake and destroy the target unless stopped. Obviously a number of these devices may simultaneously attack an enemy airplane from different directions. As the cost of the aerial torpedoes will be but a small fraction of the cost of any conventional military or naval airplane and as no loss of flying personnel is involved in their use it will be profitable to send several of these weapons against each enemy aircraft sighted or "picked up" by the usual signals. It is anticipated that a swarm of several hundred such torpedoes will scatter or destroy the heaviest armada of bombers it is possible to put in the air over a given locality at one time, without the loss of any lives in the defending forces. Since cargo type airplanes are capable of operations up to to 35,000 feet or more, it is possible to release these torpedoes within striking distance of the ceiling of any known airplane, and at those rarefied altitudes to destroy enemy planes, whose pilots are inevitably encumbered and rendered inefficient by the usual high altitude equipment and conditions.

The described flying torpedo has an armored, pointed nose 22 not only to deflect bullets but also to pierce the structure of any airplane it may be sent against, thus enhancing the probability of complete destruction thereof.

For coastal defense it has been proposed to transport small fighter planes in dirigibles and release them when an enemy is sighted, theregy to destroy the enemy far out at sea before he can reach his objective. However, as dirigibles have only limited "pay load" capacity and as fighter planes weigh thousands of pounds when fully fueled, armed, and armored, only a few planes can be launched from a dirigible, and reembarkation of the planes is exceedingly difficult and in certain weather conditions is impossible. Since fighter planes have limited flying radii, any such operations well offshore might result in the loss of all the fighters surviving an engagement, together with their personnel. With the torpedoes of my invention, a large number of which can be carried on a dirigible, launching may take place rapidly and once the launching is completed, the dirigible is surrounded by a swarm of protective fighters which do not require re-embarkation and which should hold at bay and inflict losses upon enemy forces until help arrives from the seacoast being defended. Thus the invention makes it possible for a single unescorted dirigible to defend itself by attacking enemy aircraft at a distance well out of range of any aerial gun and without necessarily carrying any ammunition or guns, with no possibility of losing defending airplanes and their personnel. Only the dirigible itself is in danger but, it is believed, any attacking planes will be so busy defending themselves against the torpedoes that they will have no opportunity to come close enough to strike at the dirigible. For remote control of the torpedoes a dirigible offers the special advantages of better visibility and observation facilities, easier launching, more powerful radio transmitters, and slower speed.

The torpedoes may be especially adapted to anti-submarine operations by omitting the detonator control which causes explosion upon striking any object and substituting a depth charge control such as has been in use since the first World War. If the submarine is detected running on the surface at night or in a heavy fog, yet cannot be seen, several of the torpedoes may be launched and all will be automatically guided by infrared rays toward the submarine and will be detonated when they strike the submarine or the water surface nearby. For submarine defense obviously dirigibles offer important advantages; yet since large cargo type airplanes may carry several of the torpedoes, the employment of airplanes as mother ships for the torpedoes may often be preferred due to their greater speeds and higher ceilings.

In the defense of airdromes or airfields, the torpedoes of my invention may be highly valuable, since they can be operated on a very small fuel supply and can be parked in small easily concealed sheds in the vicinity of the airdrome. No defending piloted airplane need arise from the airdrome if advance warning of an attack is received. Such a defense would be particularly desirable on small strategic islands and at isolated airdromes which must be defended, yet cannot be reached easily or manned with adequate defending personnel.

The theory may be advanced that any airplane or submarine defending against attack by the torpedoes of the invention could divert the course of a torpedo by tossing out a bright flare before the torpedo gets too close. Such a method of defense could only be successful if infrared directional control were employed, as at night. However, if such a tactic were resorted to, it would reveal the enemy's exact position and would almost certainly result in his destruction by more orthodox methods, if not by the torpedoes of this invention.

The above discussion has been confined to the use of the aerial torpedo as a strictly defensive weapon and this is its primary utility due to its limited range. However, in certain types of offensive warfare, as for instance an attack on entrenched troops where the points to be attacked can be kept under observation, the torpedoes may be very useful especially as their radius of flight greatly exceeds the maximum range of the largest guns known in ordnance, and as their speed is so great that anti-aircraft defense would be practically helpless. It is believed that swarms of these torpedoes may be sent against troops, especially motorized troops on a highway, with demoralizing results. As steam locomotives are radiators of infrared rays on a huge scale, the torpedoes may also be used effectively in night attacks on enemy trains some distance behind the battle lines; and obviously power generating and steel plants will also make highly attractive targets because of their enormous radiation. When attacking aircraft from airplanes in flight having the described radio controls for directing the torpedoes, the control airplane may remain just out of range of fire of the target plane and send in one or more of the torpedoes under remote control. Thus, even without employment of any infrared control or other target-seeking means, the torpedoes would constitute valuable weapons serving the same purpose as airborne artillery but making available far greater effective radius of fire than is possible with conventional guns. Many other offensive and defensive actions may be made more effective by proper use of the torpedoes, as will be clear to military and naval experts.

It may be objected that if swarms of these torpedoes are let loose at night upon an invading air force some of them will be guided by the infrared rays of other torpedo power plants into collision and hence will be destroyed without damage to the enemy. However, by launching the torpedoes from widely separated points or from the same points at sufficiently spaced time intervals, the overtaking of one torpedo by another will be impossible during their brief flying lives, and only chance will bring two torpedoes together when they reach the zone of enemy activity. Since the infrared rays of a single airplane engine of 1200 to 2000 horsepower are far more intense than those emitted from a 125 horsepower torpedo, it is much more likely that the torpedoes will be directed toward enemy planes than toward each other. However, if a collision between two of the torpedoes, both seeking the same target plane, does occur, it will likely occur near the target plane and the resultant explosion and the destructive effects thereof will be greatly intensified by the fact that two torpedoes are involved.

Having described one form of the invention, I desire it to be understood that many details may be varied or modified and some may be omitted without departing from the invention, the scope of which is defined in the appended claims.

What is claimed is:

1. A self-propelled pilotless aircraft having a control system for automatically maintaining a predetermined flight pattern; a second control system for directing the aircraft constantly toward a source of radiant energy; a third control system responsive to operator-governed radio frequency signals; said systems each being selectively operable; and a fourth control system operated by radio waves under the control of an operator at a remote point and providing means to select which one of the three systems shall operate.

2. The invention according to claim 1, wherein the third control system is constructed and arranged to be responsive to amplitude ratios of pairs of signals.

3. Apparatus for controlling an aerial torpedo or other pilotless self-propelled, dirigible vehicle or vessel comprising, in combination, an operator-controlled transmitting system by which two signals are transmitted simultaneously on a single carrier wave and in an amplitude ratio that may be varied at will by the operator; a receiving system carried by the torpedo, etc. that is capable of detecting and separating the two signals; a servomotor carried by the torpedo, etc.; a circuit for the servo-motor which is coupled to the receiving system; an automatic comparator that causes the servo-motor to assume a position for each value of amplitude ratio of the two signals; proportional in its distance from a pre-selected middle position of rotation of said servo-motor and torpedo-carried means operated by the servo-motor to control the movement or condition of the torpedo, etc.

4. The invention according to claim 3, wherein the torpedo has several control means and servomotors and circuits therefor, there being a servomotor for each control means of the torpedo, each servo-motor circuit including a variable voltage divider having a movable contact operated by the servo-motor in response to the amplitude ratio of the two signals, the movable contact of the voltage divider being moved until its circuit is balanced about its electrical center; each control element moving synchronously with the movable contact of the corresponding voltage divider.

5. A flying torpedo comprising, in combination, a body so formed and constructed that it will fly, propulsive means; guiding means on the body; servo-motors for controlling the guiding means on the body; control circuits selectively energizing the servo-motors; automatic devices for selectively controlling the servo-motors and acting to hold the torpedo on a straight course unless disconnected; a radio-actuated circuit-selecting switch to which said automatic devices and control circuits are connected; circuits responsive to frequency modulated radio signal and connected to said control circuits and also connected to the circuit-selecting switch; another servo-motor for operating the circuit-selecting switch in one direction or the other to change the control of the torpedo from automatic flight control to remote or radio wave control; the direction of movement of the circuit-selecting switch being determined by varying the amplitude ratio of two signals transmitted from a remote point and under the control of an operator.

6. The invention according to claim 5, wherein the torpedo structure encloses an explosive charge, a detonator for detonating said charge, a detonator relay that upon energization by radio signal, actuates said detonator, and a detonating circuit, and means controlled by received signal varied by the remote operator to close the relay to detonate the charge.

7. The invention according to claim 5, wherein there is a system of controls including a plurality of infra-red-sensitive elements distributed on the torpedo, said controls being connected with the guiding means and actuated by variation in intensities of infrared rays falling on different areas of the torpedo to cause the torpedo to fly toward the source of the infrared rays; said system being connected electrically with the circuit-selecting switch and being cut in or cut out at the will of the remote operator controlling at least one radio carrier wave upon which are impressed a plurality of modulations.

8. A flying torpedo having a body so formed and constructed that it will fly, a rudder, elevators and ailerons on the body; a reversible servo-motor mechanically connected to the rudder and another reversible servo-motor mechanically connected to the elevators; a third reversible servo-motor mechanically connected to the ailerons; an acceleration-responsive reversing switch in the circuit of the third servo-motor and operating at all times independently of all other controls; radio wave-responsive circuits for operating the motors for the rudder and elevators independently from a remote point; automatic means including circuits to control the flight of the torpedo to a substantially straight course; a circuit-selecting switch connected into the last named circuits and also connected into the radio wave-responsive circuits; and a radio-wave responsive circuit to change the control of the torpedo from purely automatic to remote control and back again at the will of the operator.

9. A flying torpedo having a body so formed and shaped that it will fly, and a self-contained power plant, said body also having an explosive charge; a detonator in a circuit; another circuit, including means responsive to a change in the ratio between the modulations impressed upon at least one radio wave, electrically coupled to the detonator circuit and adapted to control the detonator circuit to detonate the charge; still another circuit including multiple thermocouple means distributed on the torpedo in diverse locations responsive to infrared waves and means for amplifying and detecting the minute thermocouple current; said last-named circuit being electrically coupled to the detonator circuit to cause detonation when the infrared rays reach a certain intensity.

10. A flying torpedo comprising, in combination, a body having propulsive means and guiding means including a rudder, elevators and ailerons; the cooperation of which will enable the torpedo to bank while turning, automatic control circuits including two reversible servo-motors to control the guiding means to hold the torpedo normally in straight flight; and remote control means comprising an antenna, a radio receiver, at least two band pass filters, at least two amplifiers, at least two rectifiers, two potentiometers and at least two relays; each servo-motor being electrically connected to one of said relays and being mechanically connected to the movable contact of one of said potentiometers; the parts being so cooperatively constructed, connected and arranged that control resulting in the reception of signal and conversion thereof into mechanical operation of the controls is effected by a remote operator by varying individually the percentages of modulation on the carrier wave due to two single modulating frequencies of suitable value to be passed by the respective filters.

11. The invention according to claim 10 wherein there is a fourth radio-responsive control circuit having a band pass filter coupled to said receiver, an amplifier, a rectifier, a potentiometer and a relay all coupled to the band pass filter; an explosive charge in the body; a detonator and circuit therefor; the detonator circuit being electrically connected with the fourth circuit so that by varying the percentage of modulation on the carrier wave due to one modulated frequency the detonator circuit will be sufficiently excited to detonate the charge at a position adjacent the target to which it has been carried by the cooperation of the rudder- and elevator-controlling circuits.

12. A controllable flying torpedo comprising, in combination, a body so formed and shaped that it will fly; a power plant on the body for driving the same; controls on the body to cause the torpedo to turn, bank, dive or climb; a system responsive to operator-controlled radio waves, said system being carried on the body and effecting control of the flight of the torpedo and having an antenna for receiving radio signals governing the flight course of the torpedo, a radio receiver coupled to the antenna, a band pass filter coupled to the receiver, an amplifier coupled to the band pass filter; a rectifier connected to the amplifier; a potentiometer connected to the rectifier; and a polarized relay electrically connected to the movable contact of the potentiometer; the relay being so connected for maintaining a balance in the absence of signal between a pair of coils in said relay and as to be actuated by the potential drop between the movable contact on the potentiometer and one side of the rectifier, so that any signal appearing in the output of the band pass filter will tend to actuate the relay in one particular direction; another circuit leading off from the radio receiver and connected to the relay and giving a direct potential having an amplitude that is proportional to the intensity of the radio carrier wave received by the antenna and passed through said receiver, this potential being applied to the relay in such a manner as to oppose the potential from the rectifier to the relay, so that for any particular setting of the potentiometer, a given percentage of modulation on the frequency of the filter causing zero current through the relay; the relay closing in one direction if the modulating signal on the frequency to which the filter responds is increased in amplitude while the carrier wave remains unchanged, the relay closing in the other direction if the signal from the filter is reduced in amplitude; and a reversible servo-motor electrically connected with the relay and with a source of electricity and mechanically connected with one of the controls of the torpedo to operate said control in opposite directions.

13. The invention according to claim 12, wherein the servo-motor has mechanical connections with the movable contact of the potentiometer to move the same; the direction of operation of the contact being such that the system always seeks its equilibrium position in the absence of modulating signal.

14. An aerial torpedo comprising a fuselage, propelling means, a tail structure and wings; an explosive charge in the fuselage; a detonator and a circuit therefor including a source of electricity; and a grid consisting of a fine wire strung throughout the fuselage, tail structure and wings; said grid being electrically connected to the detonating circuit, and a relay also in said circuit which is electrically connected to the grid so that the relay closes when the grid is broken at any point, thereby to close the detonator circuit to detonate the explosive.

15. An aerial torpedo having a body capable of sustained guided flight and carrying an explosive charge and a detonator; a detonating circuit including a source of electricity, a relay, a rectifier, an amplifier, a thermocouple sensitive to infrared rays, and the detonator, all coupled together; said relay closing when subjected to amplified impulses generated by the thermocouple responsive to infrared rays, and detonating the charge.

16. The invention according to claim 15, wherein there is a circuit-selecting switch on the torpedo; a servo-motor for operating the switch; a motor control circuit controlled by frequency modulation by an operator at a remote point; and a circuit connecting the circuit-selecting switch and said relay so that the remote operator may make the relay operative or inoperative by control of radio signals to vary appropriately the amplitude thereof to accomplish the result desired.

17. An aerial torpedo comprising a body having flight-sustaining means, guiding means and propelling means, and containing an explosive charge; means controlled by differences in intensities of infrared rays falling the torpedo and acting automatically to guide the torpedo constantly toward the source of such rays; a detonator for detonating the explosive charge; and means controlled by infrared rays and automatically operating upon a predetermined material increase in such rays to detonate the explosive charge.

18. An aerial torpedo comprising a body having flight-sustaining means, guiding means, and propelling means; a charge of explosive and a detonator in the body; and means carried on the body and controlled by infrared rays and acting automatically upon a very great increase in such rays to detonate the explosive charge; said means comprising a plurality of thermocouples, a detonating circuit controlled by the thermocouples, a source of electricity for energizing said circuit; and means to shield the thermocouples from the radiant energy of the propelling means.

19. An aerial torpedo having the characteristics of an airplane, with wings, rudder and elevators; a heat radiating engine propelling the torpedo; two pairs of thermocouples, each pair being mounted on the leading edge of a wing; electro-mechanical means including a group of electric circuits interposed between one pair of thermocouples and the rudder and acting responsive to differences in intensities of infrared rays received by the thermocouples to turn the torpedo in the direction whence rays of the most intensity emanate; similar electro-mechanical means interposed between the other pair of thermocouples and the elevators and acting in the same manner to direct the torpedo toward the most intense rays; a group of electric wave filters included as an element common to all of said circuits; an explosive charge in the torpedo; and an electric circuit for detonating the same, said circuit including one filter of the said group of filters.

20. The invention according to claim 19, wherein means are provided to shield each thermocouple of each pair from one-half of the area in front of the torpedo so as to be sensitive only to infrared rays either to the right or left of the vertical plane of symmetry, or above or below the horizontal plane of symmetry, as the case may be.

21. The invention according to claim 19, wherein the wing tips carry a third pair of thermocouples and a circuit connects this third pair of thermocouples with the detonating means; the parts being so constructed, connected and arranged that when infrared rays of a suitable high intensity fall upon the wing tip thermocouples, or either of them, the charge will be detonated.

22. An aerial self-propelled torpedo having means for controlling the direction of flight; automatic means in the torpedo for operating the flight controls to maintain flight in a straight path; radio wave-controlled means for disconnecting said automatic means and for taking over flight control; an explosive charge; detonating means; means to effect detonation upon collision of the torpedo with any object; and radio-wave-controlled means to effect detonation at the will of an operator.

23. The invention according to claim 22, wherein the torpedo also contains a clock switch in circuit with the detonating means and with a source of electricity; said clock switch being adapted to prevent detonation of the explosive charge until after a predetermined time interval; and means moved by an operator from outside the torpedo prior to launching the same to put the clock switch in circuit, so that the torpedo may be destroyed by detonation after said time interval.

24. The invention according to claim 22, wherein the torpedo has propelling means driven by a power plant, and a centrifugal contactor is directly driven by the power plant and is in circuit with the detonating means and a source of electricity; said contrifugal contactor closing the detonator circuit to effect destruction of the torpedo when the power plant drops below a certain speed.

25. A day or night flying torpedo having a body carrying an explosive charge, detonating means, a power plant, propelling means operated by the power plant, and guiding means; an automatic control system for causing the guiding means to direct the torpedo in a straight path and to return it to the straight path in the event it deviates therefrom; a radio wave controlled system adapted to take over control of the path of the torpedo at any moment during the flight thereof, at the will of the operator; an infrared-ray-responsive system adapted to direct the course of flight of the torpedo toward any source of infrared rays and to turn always toward the point whence the most intense infrared rays emanate; said infrared-ray-responsive system being entirely automatic but being made operative or inoperative by means responsive to radio waves under the control of a remote operator; and a manual switch to render said infrared ray system inoperative in daylight.

26. The invention according to claim 25 wherein the torpedo further carries infrared-ray-controlled means connected with the detonating means to effect detonation upon a very large increase in infrared rays intercepted by the torpedo.

27. An airborne missile, an antenna on said missile, a radio receiver connected to said antenna, three parallel controlling circuits, three servo-motors controlled by said circuits, a fourth servo-motor, a circuit selecting switch operated by said fourth servo-motor, a band pass filter in each controlling circuit coupled to the radio receiver, a rectifier for each controlling circuit connected to the output side of the filter, a potentiometer, a polarized relay and the necessary conductors for each controlling circuit; the first, second and fourth named servo-motors being each mechanically connected with a potentiometer to many relatively movable contacts thereof; each relay closing in a direction determined by the unbalance of its circuit to effect rotation of the servo-motor connected thereto in a corresponding direction whereby said servo-motors operate controls which determine the flight path of the missile.

PAUL W. NOSKER.

REFERENCES CITED

The following references are of record in the file of this patent:

UNITED STATES PATENTS

| Number | Name | Date |
|---|---|---|
| 913,372 | Gardner | Feb. 23, 1909 |
| 925,707 | Lake | June 22, 1909 |
| 1,303,105 | Murdock | May 6, 1919 |
| 1,382,375 | Menchen | June 21, 1921 |
| 1,387,850 | Hammond | Aug. 16, 1921 |
| 1,513,108 | Hammond | Oct. 28, 1924 |
| 1,623,475 | Hammond | Apr. 5, 1927 |
| 1,670,641 | Sperry | May 22, 1928 |
| 1,792,937 | Sperry | Feb. 17, 1931 |
| 1,822,868 | Grimes | Sept. 8, 1931 |
| 1,974,884 | Von Opel | Sept. 25, 1934 |
| 2,099,808 | Havill | Nov. 23, 1937 |
| 2,109,475 | Fanning | Mar. 1, 1938 |
| 2,176,469 | Moueix | Oct. 17, 1939 |
| 2,237,848 | Smith | Apr. 8, 1941 |
| 2,255,245 | Ferrell | Sept. 9, 1941 |
| 2,399,954 | Thomson | May 7, 1946 |

FOREIGN PATENTS

| Number | Country | Date |
|---|---|---|
| 132,301 | Great Britain | Sept. 5, 1919 |
| 406,477 | Great Britain | Mar. 1, 1934 |
| 440,156 | Great Britain | Dec. 20, 1935 |
| 91,592 | Sweden | Feb. 24, 1938 |